Jan. 23, 1923. 1,443,085
M. H. MOSES.
MOTOR VEHICLE FENDER.
FILED JULY 7, 1921. 2 SHEETS-SHEET 2
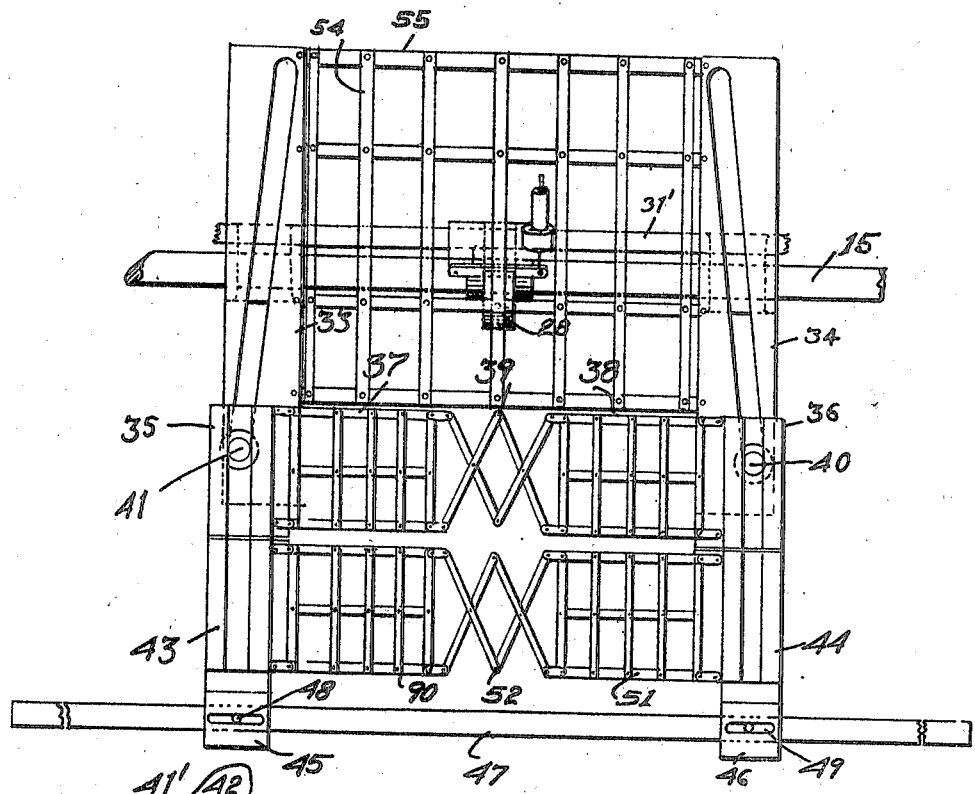
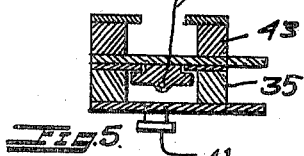
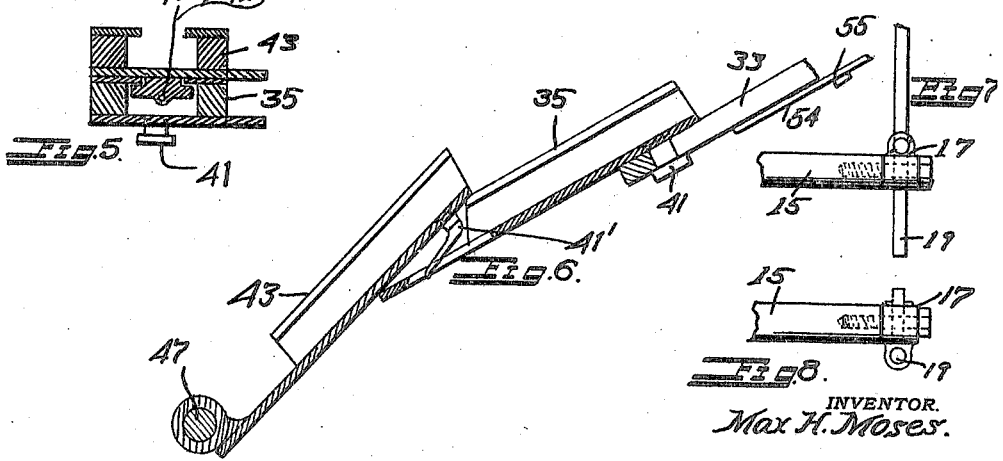
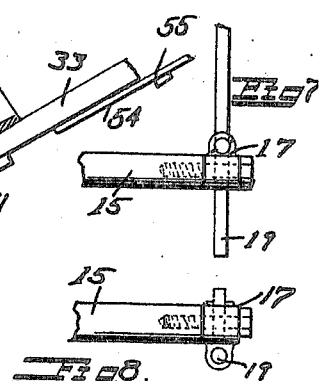
INVENTOR.
Max H. Moses.
BY
Carlos P. Griffin
ATTORNEY.

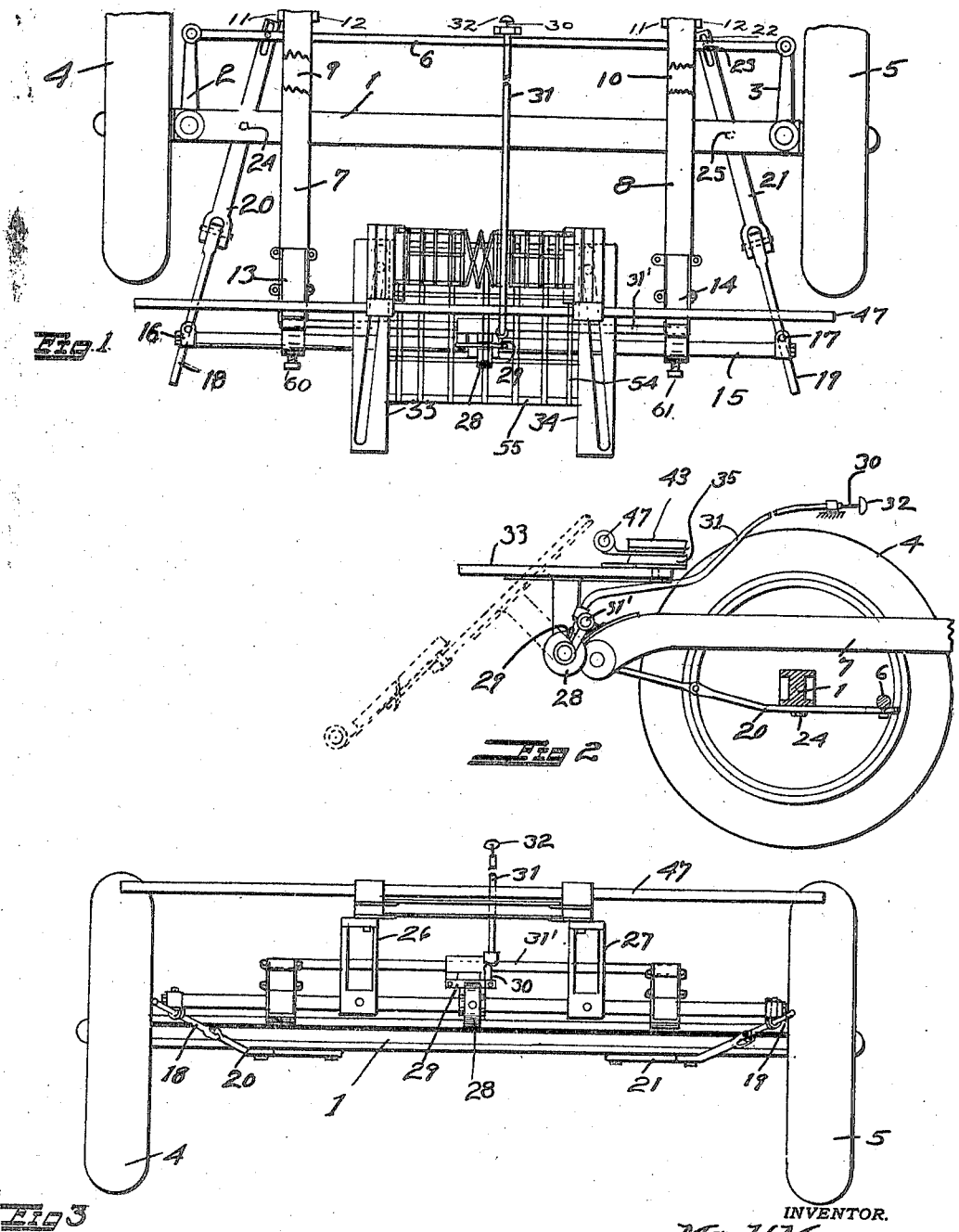
Jan. 23, 1923.
M. H. MOSES.
MOTOR VEHICLE FENDER.
FILED JULY 7, 1921.
1,443,085
2 SHEETS-SHEET 1
INVENTOR.
Max H Moses.
BY
Carlos P. Griffin
ATTORNEY.

Patented Jan. 23, 1923.

1,443,085

UNITED STATES PATENT OFFICE.

MAX H. MOSES, OF SAN FRANCISCO, CALIFORNIA.

MOTOR-VEHICLE FENDER.

Application filed July 7, 1921. Serial No. 482,886.

*To all whom it may concern:*

Be it known that I, MAX H. MOSES, a citizen of the United States, residing at San Francisco, in the county of San Francisco, State of California, have invented a new and useful Motor-Vehicle Fender, of which the following is a specification in such full and clear terms as will enable those skilled in the art to construct and use the same.

This invention relates to a motor vehicle fender and its object is to provide means to prevent pedestrians from being run over by the wheels of the vehicle, while at the same time the fender is normally held off the ground sufficient to prevent it striking ordinary obstacles over which the car may be compelled to pass.

Another object of the invention is to provide means whereby the fender may be moved from side to side to compensate for the steering of the vehicle, so as to bring the fender always to a position to protect the person against either wheel.

Another object of the invention is to provide a fender which is capable of being dropped in front of the vehicle to prevent persons from being run over, and which may be used with or without the mechanism for shifting the fender from side to side to correspond with the position of the steering wheels, in which event the shifting mechanism is simply removed from the car.

Other objects of the invention will appear as the description proceeds.

An embodiment of the invention is shown in the accompanying drawings in which the same reference numeral is applied to the same portion throughout, but I am aware that there may be modifications thereof.

Fig. 1 is a plan view of the fender as it appears applied to the front of a motor vehicle.

Fig. 2 is a side elevation of the fender showing a portion of the motor vehicle, and the operating mechanism.

Fig. 3 is a front elevation of the fender as it appears applied to a motor vehicle.

Fig. 4 is a plan view of the fender as it appears applied to a machine and extended in use.

Fig. 5 is a cross-sectional view of two of the fender-carrying slides.

Fig. 6 is a sectional view of two of the fender slides showing their manner of operation when being extended.

Fig. 7 is a view of one of the fender supporting rods, and

Fig. 8 is a view of the fender supporting rods looking at right angles to Fig. 7.

The numeral 1 indicates the front axle of a motor vehicle. This has the usual steering knuckles 2 and 3 applied at its ends, said knuckles being supported by the wheels 4 and 5. The steering knuckle arms are connected at the drag links 6.

The frame of the motor vehicle is indicated at 7 and 8 and is supported in the usual manner by long leaf springs 9 and 10 immediately below the same and connected at their rear ends to links 11 and 12 on each side frame.

At the front end of the frame members 7 and 8 there are two castings 13, 14 which have holes at their front ends to receive the slidable rod 15. The rod 15 is pivotally connected at its ends by means of clamps 16 and 17 to two rods 18 and 19 pivotally connected in a vertical plane with arms 20 and 21; the latter of which has a slot at its rear end as indicated at 22 through which the pin 23 on the drag link passes to cause the rod 15 to slide to a position in front of the wheels in accordance with their turning movement.

The rods 20 and 21 are pivotally connected to the under side of the axle at 24, 25. The rod 15 has two T-shaped brackets 26, 27 rigidly connected therewith and at its center it has a lug 28. This lug is normally engaged with a lever 29 which prevents the rod 15 from turning forwardly or downwardly. This lever is connected to a wire 30 inside a flexible tube 31. The wire 30 has a handle 32 within convenient reach of the driver, and by pulling up on the same he can release the lever 29 from engagement with the lug 28 on the shaft 15, and permit the shaft to turn forwardly and downwardly.

The lever 29 and the terminal for the flexible tube 31 are supported by a cross bar 31′ connected at its ends to the main frame members 13 and 14.

The brackets 26, 27 support two slotted plates 33, 34 on which the upper slides 35, 36 rest and by which the grill work 37, 38 and flexible extending links 39 are supported.

The slides 35, 36 have lugs 40, 41 connected therewith, which lugs pass through the slots in the plates 33, 34 and cause the slides 35, 36 to move away from each other when the fender falls down. The slides 35, 36 are slotted longitudinally to receive the lugs 41', 42 on the lower slides 43, 44, and the lower slides have extensions 45, 46 to support the bumper 47. The bumper 47 is slotted as indicated at 48, 49 so as to permit the two slides 43, 44 to move apart as the fender falls down.

The slide 43 has a grill work 50 connected therewith, while the slide 44 has a grill work 51 connected therewith, and the two grills are connected by suitable pivoted links 52 to permit the slides 43, 44 to move apart as the fender falls down. The slides 33, 34 are connected by a plurality of longitudinally and transverse members 54, 55 which grill work forms an extension of the grill work connecting the slides 43, 44 and 35, 36 when the latter are extended.

The operation of the apparatus is as follows: Normally the fender will be raised to the position shown in Figure 2 with both of the grills resting in a horizontal position over the supporting rod 15. As the machine is driven from place to place the rod 15 will be moved laterally so that it will always be in the proper position with respect to both wheels regardless of whether they are being turned or traveling straight ahead. If there is danger of a pedestrian being struck, the driver will immediately throw the fender down by pulling on the cable handle 32. This will tilt the plates 33, 34 down and at the same time will release both fenders and prevent the person being struck from being run over by the wheels. If the fender shifting mechanism is not to be used it is taken off the car and the two set screws 60, 61 are tightened to prevent the fender from moving laterally.

What I claim is as follows, but various modifications may be made in the construction shown in the drawings and above particularly described form, within the purview of my invention.

1. A motor vehicle fender comprising the combination with a motor vehicle of a slidable support at the front of the vehicle frame, a fender carried thereby, and means to shift the fender to correspond with the position of the steering wheels.

2. A motor vehicle fender comprising the combination with a motor vehicle frame of a support carried thereby, a pair of pivoted slides on said support, fender members carried by the slides, and means to hold the slides and fenders in a raised position.

3. A motor vehicle fender comprising the combination with a motor vehicle frame of a rod extending transversely thereof, means to slide said rod transversely of the frame to correspond with turning movements of the vehicle wheels, an extensible fender carried by said rod, means to lock the fenders in a raised position, and means to release said lock to slide down to a position in front of the vehicle wheels.

4. A motor vehicle fender comprising a vehicle frame, a rod slidable transversely thereof at the front end of the frame, means connected with the steering mechanism to slide said rod with turning movements of the wheels, fenders carried by said slides, means to lock the fenders and slides in a raised position, and means to drop the fenders and slides in front of the wheels at will.

5. A motor vehicle fender comprising a vehicle frame, a transverse rod carried thereby at the front end of the frame, tiltable supports on said rod, means to hold said supports normally in a raised position, means to release said supports, and a pair of fenders slidably connected to drop down into proximity to the ground when the tilting members are released.

6. A motor vehicle fender comprising the combination with a motor vehicle frame of a tilting support carried at the front end thereof, means to hold said support raised, means to release said support at will, a pair of slides on said support, a grill work connecting the slides, and a bumper bar connected with the lowermost slide.

In testimony whereof I have hereunto set my hand this 27" day of June A. D. 1921.

MAX H. MOSES.